United States Patent
Epaud et al.

(10) Patent No.: US 8,579,374 B2
(45) Date of Patent: Nov. 12, 2013

(54) VEHICLE SEAT

(75) Inventors: David Epaud, Cerny (FR); Fabrice Lesbats, Sucy en Brie (FR)

(73) Assignee: Faurecia Sièges d'Automobile, Nanterre (FR)

( * ) Notice: Subject to any disclaimer, the term of this patent is extended or adjusted under 35 U.S.C. 154(b) by 285 days.

(21) Appl. No.: 13/002,718

(22) PCT Filed: Jul. 10, 2009

(86) PCT No.: PCT/FR2009/051384
§ 371 (c)(1),
(2), (4) Date: Jan. 5, 2011

(87) PCT Pub. No.: WO2010/010274
PCT Pub. Date: Jan. 28, 2010

(65) Prior Publication Data
US 2011/0115273 A1    May 19, 2011

(30) Foreign Application Priority Data

Jul. 21, 2008 (FR) ..................... 08 54953

(51) Int. Cl.
*B60N 2/02* (2006.01)
(52) U.S. Cl.
USPC ................... 297/334; 297/378.12
(58) Field of Classification Search
USPC ......... 297/316, 321, 334, 378.12, 378.1, 340; 296/65.16, 65.05, 65.09
See application file for complete search history.

(56) References Cited

U.S. PATENT DOCUMENTS

| 2,740,950 | A | | 4/1956 | Grillo |
| 5,454,624 | A | | 10/1995 | Anglade et al. |
| 5,979,985 | A | | 11/1999 | Bauer et al. |
| 6,000,742 | A | * | 12/1999 | Schaefer et al. ........... 296/65.09 |
| 6,601,900 | B1 | * | 8/2003 | Seibold ....................... 296/65.09 |
| 8,308,242 | B2 | * | 11/2012 | Hurst et al. ................... 297/341 |
| 8,313,144 | B2 | * | 11/2012 | Holdampf ..................... 297/340 |
| 2004/0251705 | A1 | * | 12/2004 | Tame et al. ................ 296/65.09 |
| 2005/0062328 | A1 | * | 3/2005 | Becker et al. ............ 297/378.12 |

(Continued)

FOREIGN PATENT DOCUMENTS

| CN | 1412043 A | 4/2003 |
| DE | 196 46 470 A1 | 5/1998 |

(Continued)

OTHER PUBLICATIONS

Chinese Office Action in related Chinese Application No. CN 200980128828.2; action dated Sep. 4, 2012.

(Continued)

*Primary Examiner* — David Dunn
*Assistant Examiner* — Alexander Harrison
(74) *Attorney, Agent, or Firm* — Miller, Matthias & Hull LLP

(57) ABSTRACT

The motor vehicle seat of the present invention includes: a seat proper mounted on a pillar by means of a first connecting rod assembly including a front connecting rod and a rear connecting rod; a backrest mounted on the pillar by means of a second connecting rod assembly including a front connecting rod and a rear connecting rod; a locking mechanism for alternately restricting or enabling a movement of the backrest relative to the pillar, the seat being freely movable between a nominal position and a folded back position.

11 Claims, 2 Drawing Sheets

(56) References Cited

U.S. PATENT DOCUMENTS

| | | |
|---|---|---|
| 2006/0033373 A1* | 2/2006 | Kammerer ................ 297/378.1 |
| 2007/0018492 A1* | 1/2007 | Becker et al. ............ 297/378.12 |
| 2009/0001795 A1* | 1/2009 | Homier et al. ................ 297/341 |

FOREIGN PATENT DOCUMENTS

| | | |
|---|---|---|
| DE | 10 2004 042 038 B4 | 3/2006 |
| EP | 1 625 966 A2 | 1/2005 |
| EP | 1 547 856 A1 | 6/2005 |
| EP | 1547856 A1 | 6/2005 |
| FR | 2 718 399 | 4/1994 |
| FR | 2 877 283 | 10/2004 |
| FR | 2882705 A1 | 9/2006 |
| JP | 2003220864 A | 8/2003 |
| WO | WO-2008/064484 A1 | 6/2008 |

OTHER PUBLICATIONS

French Preliminary Search Report for priority application No. FR 08 54953; Report dated Jan. 28, 2009.

French Written Opinion for priority application No. FR 08 54953; Report dated Jan. 28, 2009.

International Search Report for related international application No. PCT/FR2009/051384, report dated Nov. 4, 2009.

International Written Opinion for related international application No. PCT/FR2009/051384.

* cited by examiner

VEHICLE SEAT

CROSS-REFERENCE TO RELATED APPLICATIONS

This application is a U.S. national stage filing under 35 USC §371 of International Patent Application No. PCT/FR2009/051384 filed on July 10, 2009, which claims priority under the Paris Convention to French Application No. FR 08 54953, filed on Jul. 21, 2008.

FIELD OF THE DISCLOSURE

The present invention relates to vehicle seats.

BACKGROUND OF THE DISCLOSURE

More particularly, the invention relates to a folding vehicle seat.

Document FR 2 877 283 describes an example of such a vehicle seat in which the seat proper is mounted on the floor via a front connecting rod, and the backrest is mounted on the floor via a rear connecting rod. In addition, the backrest comprises a wheel rolling on a rail extending towards the rear of the seat when the backrest is folded forwards. In addition, the seat proper is pivotably mounted directly on the backrest.

Although this seat is entirely satisfactory, optimization of the folding cinematics of a seat is still sought, for example in cases where a rail extending towards the rear of the seat is not desired, for example for reasons of space occupied.

To this end, a motor vehicle seat is envisaged comprising:
a base adapted to be mounted on a chassis of the motor vehicle,
a seat proper mounted on the base via a first connecting rod assembly comprising a front connecting rod and a rear connecting rod, each having a first connection point mounted pivotably on the base and a second connection point mounted pivotably on the seat proper,
a backrest mounted on the base via a second connecting rod assembly comprising a front connecting rod and a rear connecting rod, each having a first connection point mounted pivotably on the base and a second connection point mounted pivotably on the backrest,
a locking mechanism adapted to alternately adopt an active state in which it prevents a movement of the backrest relative to the base, and an inactive state in which it allows said movement,
a control member that can be actuated by a user to place the locking mechanism alternately in its active state and its inactive state,
the seat being freely moveable, in the inactive state of the locking mechanism, between a nominal position in which an occupant can take up position in the seat, and a folded position in which the backrest extends parallel to the seat proper.

Thanks to these arrangements, a new seat folding cinematics is provided.

In various embodiments of the seat according to the invention, one or more of the following arrangements may be used:
first and second seat components are selected from the backrest and the seat proper, and the first and second connecting rod assemblies are connected in such a way that the movement of the first seat component results in the movement of the second seat component;
a connecting rod of the first connecting rod assembly and a connecting rod of the second connecting rod assembly are common;
the rear connecting rods of the first connecting rod assembly and the second connecting rod assembly are common;
the first connection point of the common connecting rod is common, and the second connection points of the common connecting rod are separate;
for the common connecting rod, the second connection point to the seat proper is located between the first connection point and the second connection point to the backrest;
a length of the front connecting rod of the first connecting rod assembly between its first and second connection points is equal to a length of the rear connecting rod of the first connecting rod assembly between its first and second connection points;
the backrest and the seat proper each comprise a receiving surface capable of receiving an occupant of the seat in the nominal position, and said receiving surfaces face each other in the folded position;
in the nominal position, the front connecting rod of the first connecting rod assembly extends backwards;
in the nominal position, the rear connecting rod of the first connecting rod assembly extends forwards;
the vehicle seat also comprises an anchor mechanism adapted to alternately adopting an active state in which it secures the backrest to the base in the folded position, and an inactive state in which it releases it therefrom; and
there is no direct pivoting connection between the backrest and the seat proper.

Other characteristics and advantages of the invention will become apparent on reading the following description of one of its embodiments, given as a non-limitative example, with reference to the attached drawings.

SUMMARY OF THE DISCLOSURE

Figure 1:
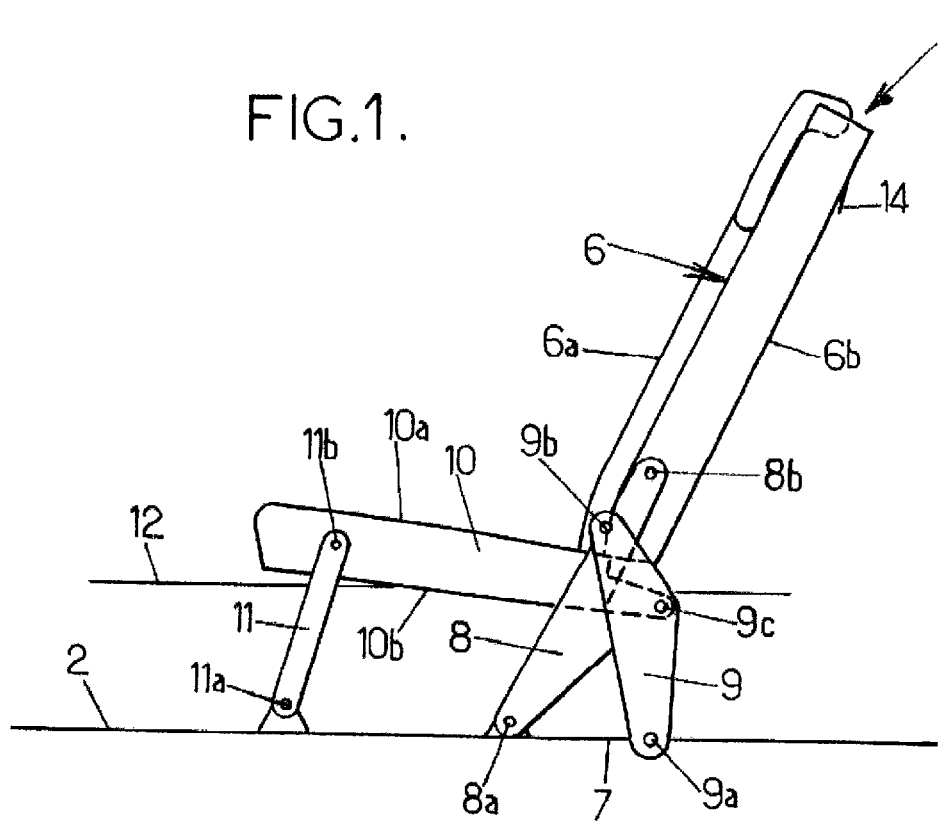
FIG. 1 is a diagrammatical side view of a seat in the nominal position.
Figure 3A:
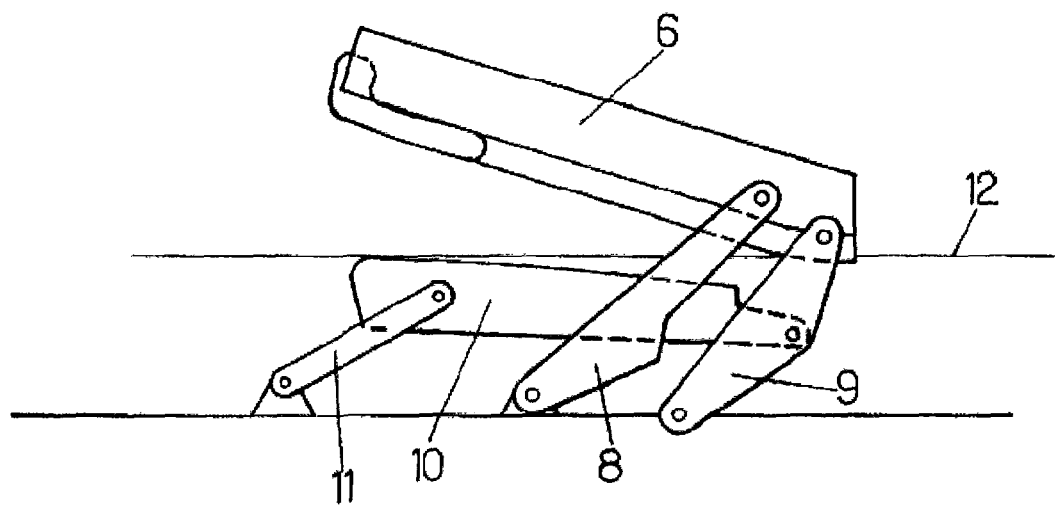
Figure 3B:
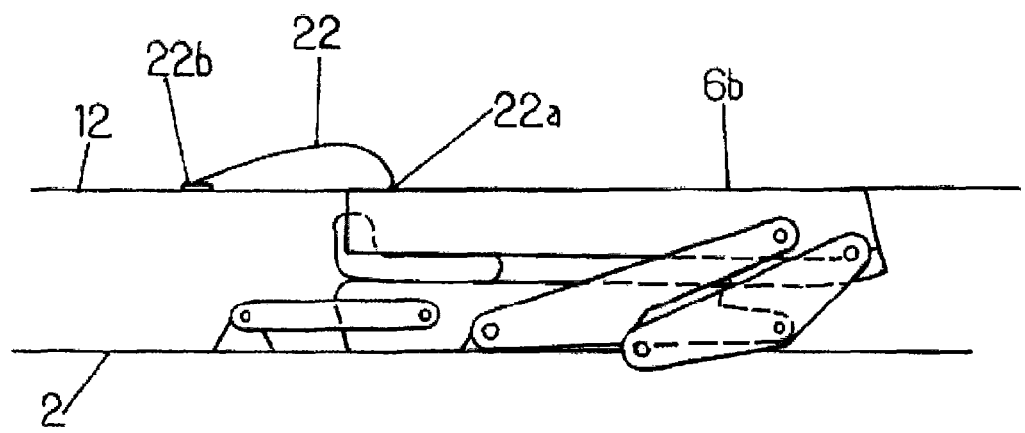

FIGS. 3*a* and 3*b* are views corresponding to FIG. 1 of the seat in FIG. 1 in respectively inclined and folded positions of the seat.

DETAILED DESCRIPTION OF THE DRAWINGS

In the various figures, the same reference denotes identical or similar components.

FIG. 1 shows a motor vehicle seat 1 capable of receiving one or more occupants, mounted on a motor vehicle chassis 2. Such a seat can be mounted in various orientations in the vehicle, the terms "front", "rear", "left", "right" and other orientation terms relating to the seat in the description only referring to the orientation of the seat itself, regardless of the orientation of the seat in the vehicle, unless expressly stipulated otherwise.

By way of example, such a seat can be a so-called "back row" seat, that is, the row located furthest away from the driver's seat, for example a third row seat.

According to a first embodiment shown in FIG. 1, in its nominal position in which an occupant conventionally takes up position in the seat, the seat 1 comprises a backrest 6, having a front face 6*a* intended to receive the back of the occupant, and an opposite rear face 6*b*. The backrest is mounted on a base 7 secured to the chassis 2 via a backrest connecting rod assembly. In FIG. 1, the seat is shown fixed to the chassis of a vehicle having a loading line 12.

This backrest connecting rod assembly comprises a pair of parallel front connecting rods 8 (only one front connecting rod 8 can be seen in FIG. 1) extending between a first end 8a mounted pivotably on the base 7 and a second end 8b mounted pivotably on the backrest 6.

This backrest connecting rod assembly also comprises a pair of parallel rear connecting rods 9 (only one rear connecting rod 9 can be seen in FIG. 1) extending between a first end 9a mounted pivotably on the base 7 and a second end 9b mounted pivotably on the backrest 6.

A deformable quadrilateral is thus formed by the connection points between the components 8a, 8b, 9b, 9a. In the nominal position shown, it will be noted that this quadrilateral is crossed, that is, the sides formed by the front 8 and rear 9 connecting rods cross each other.

According to this first embodiment shown in FIG. 1, the seat also comprises a seat proper 10 capable of receiving the pelvis and the legs of the occupant. The seat proper 10 extends from a rear end to a front end and has an upper face 10a intended to receive the pelvis and the legs of the occupant and an opposite lower face 10b. The seat proper is mounted on the base 7 via a seat proper connecting rod assembly.

This seat proper connecting rod assembly comprises a pair of parallel front connecting rods 11 (only one front connecting rod 11 can be seen in FIG. 1) extending between a first end 11a mounted pivotably on the base 7 and a second end 11b mounted pivotably on the seat proper 10. The front connecting rods 11 extend for example upwards and backwards, along the axis of the backrest, in the nominal position of the seat. The chosen orientation of the connecting rods 11 and 9 allows improved retention of the occupant in the seat in the event of a vehicle impact along the axis of the seat.

This seat proper connecting rod assembly also comprises a pair of rear connecting rods which, in the example shown, are common with the backrest rear connecting rods 9 set out above. For the connection of the seat proper to the base 7, the seat proper rear connecting rod 9 is considered to extend between a connection end connected to the base 7 which, in the example shown, is common with the connection end 9a set out above, and a connection point 9c mounted pivotably on the seat proper 10.

In particular, in the example shown, the connection point 9c extends substantially between the first 9a and second 9b ends of the backrest rear connecting rod 9, and behind an imaginary line joining these two ends 9a, 9b.

A deformable quadrilateral is thus formed by the connection points between the components 11a, 11b, 9c, 9a. In the nominal position shown, it will be noted that this quadrilateral is substantially a trapezium. In particular, the length of the front connecting rod 11 between its two ends 11a and 11b is substantially equal (to within 15%) to the length of the rear connecting rod 9 between its first end 9a and its connection point 9c. Furthermore, the rear connecting rods 9 extend for example upwards and forwards in the nominal position of the seat.

Thus, the backrest and the seat proper are connected to each other in this example by their common connecting rod 9. There is no direct pivoting mounting of the seat proper on the backrest.

The seat 1 in this example has a folding control member 14 such as, for example, a handle located on the rear surface of the backrest, and designed so that the user can, by actuating it, bring the seat into a folded position in which the backrest extends substantially parallel to the seat proper, for example under the loading line. This folding control member 14 forms part of a folding control system, for example using cables, allowing the occupant's fold command to be transmitted to a locking mechanism of the seat.

Figure 2:
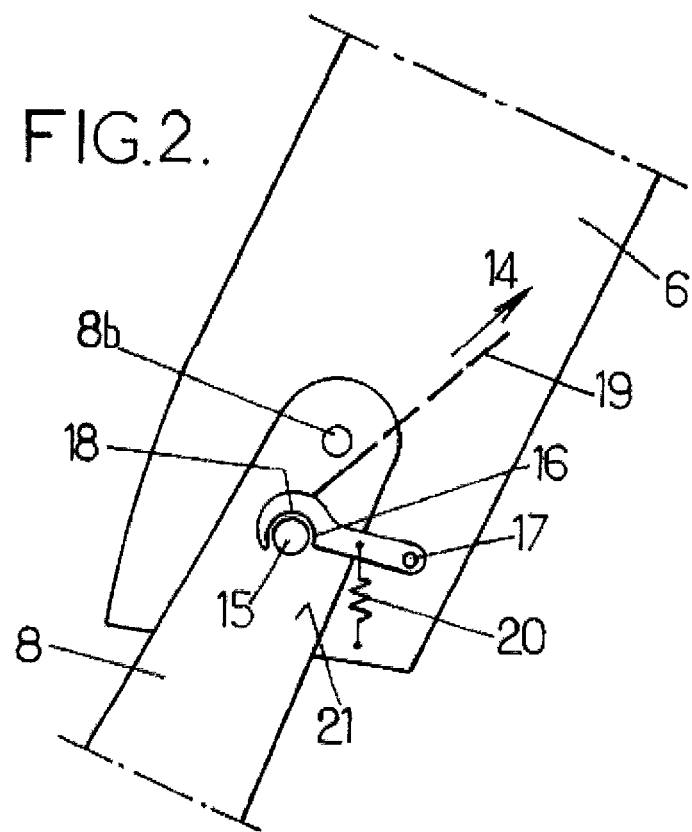
FIG. 2 is a cross-sectional view of an example of a fixing mechanism.

An illustrative example of a locking mechanism 21 is described below in relation to FIG. 2. By way of example, a pin 15 is provided extending from the front connecting rod 8 along an axis perpendicular to the plane of the drawing. Furthermore, a hook 16 comprises a connection portion 17 where it is mounted pivotably on a frame of the backrest 6, and a locking portion 18 having a complementary shape to the pin 15. The hook 16 is connected to the folding control 14 via a cable 19 and can thus be moved, by rotation around the pivot shaft 17, by the actuation of the folding control member 14 by a user, between:

an active position, shown in FIG. 2, in which its locking portion 18 cooperates with the pin 15 to prevent a relative movement of the backrest 6 and the front connecting rod 8, and an inactive position in which its locking portion 18 is released from the pin 15, which allows a relative movement of the backrest 6 and the front connecting rod 8.

A spring 20, shown diagrammatically, pushes the hook 16 towards its locked position.

The seat described above operates as follows.

The nominal position of use has already been described above with reference to FIG. 1. When the user wishes to place his seat in the so-called "folded" or "retracted" position, he actuates the folding handle 14, which causes the unlocking of the locking mechanism 21. The user is then free to rotate the backrest 6 forwards relative to the base 7 as shown in FIG. 3a, then release the handle 14. During the joint movement of the backrest and the seat proper from the nominal position to the folded position, the seat proper mainly has a movement during which it remains substantially parallel to its nominal position. However, due to the crossed quadrilateral configuration of the backrest connecting rod assembly, the backrest falls rapidly forwards. During this movement, a significant gap is maintained between the backrest and the seat proper due to the chosen configuration of the connecting rods 8, 9 and 11. Thus, during folding, no interference occurs between the seat proper and the backrest, even if the seat components are fitted with bulky padding, particularly lateral supports. Optionally, folding is assisted by a spring, not shown, for example a spiral spring at one of the pivots such as the pivot 11a. In the folded flat position shown in FIG. 3b, the front face 6a of the backrest 6 extends substantially horizontally and/or parallel to the seat proper 10 opposite the upper face 10a of the latter. The seat thus fits into a reduced height in this position, in which it can be retracted under the floor line 12. The rear surface 6b of the backrest then forms a flat loading floor.

In this position, the seat can be fixed to the base 7 via any appropriate mechanism. For example, a belt 22 can be envisaged, extending under normal circumstances on the rear surface 6b of the backrest and having a first end 22a fixed, for example sewn, to the backrest, and a second end 22b that can be secured to the vehicle chassis, for example at the level of the loading line 12, or for example to a seat located in front of the seat in question and also retracted into the floor, or other. For example, the end 22b of the belt 22 is fitted with a hook and loop strip cooperating with a complementary hook and loop strip on the chassis/the other seat.

To return the seat to its nominal position in FIG. 1, the belt 22 is detached from the chassis, and the seat is free to move to its nominal position in FIG. 1 under the action of a user. In the nominal position, the locking mechanism 21 returns to its active locking state.

The invention claimed is:

1. A motor vehicle seat comprising:
   a base capable of being mounted on a chassis of the motor vehicle,
   a seat proper mounted on the base via a first connecting rod assembly comprising a front connecting rod and a rear connecting rod, the front connecting rod and the rear connecting rod of the first connecting rod assembly having each a first connection point mounted pivotably on the base and a second connection point mounted directly and pivotably on the seat proper,
   a backrest mounted on the base via a second connecting rod assembly comprising a front connecting rod and a rear connecting rod, the front connecting rod and the rear connecting rod of the second connecting rod assembly having each a first connection point mounted pivotably on the base and a second connection point mounted directly and pivotably on the backrest,
   a locking mechanism adapted to alternately adopt an active state in which it prevents a movement of the backrest relative to the base, and an inactive state in which it allows said movement,
   a control member actuable by a user to place the locking mechanism alternately in its active state and its inactive state,
   in which a connecting rod of the first connecting rod assembly and a connecting rod of the second connecting rod assembly are common,
   the seat being freely moveable, in the inactive state of the locking mechanism, between a nominal position in which an occupant can take up position in the seat, and a folded position in which the backrest extends parallel to the seat proper.

2. The vehicle seat according to claim 1 in which the first and second connecting rod assemblies are connected in such a way that the movement of the seat proper results in the movement of the backrest or the movement of the backrest results in the movement of the seat proper.

3. The vehicle seat according to claim 1, in which the rear connecting rods of the first connecting rod assembly and the second connecting rod assembly are common.

4. The vehicle seat according to claim 1, in which the first connection point of the common connecting rod is common, and in which the second connection points of the common connecting rod are separate.

5. The vehicle seat according to claim 4, in which, for the common connecting rod, the second connection point to the seat proper is located between the first connection point and the second connection point to the backrest.

6. The vehicle seat according to claim 1, in which a length of the front connecting rod of the first connecting rod assembly between its first and second connection points is equal to a length of the rear connecting rod of the first connecting rod assembly between its first and second connection points.

7. The vehicle seat according to claim 1, in which the backrest and the seat proper each comprise a receiving surface adapted to receive an occupant of the seat in the nominal position, and in which said receiving surfaces face each other in the folded position.

8. The vehicle seat according to claim 1, in which, in the nominal position, the front connecting rod of the first connecting rod assembly extends backwards.

9. The vehicle seat according to claim 1, in which, in the nominal position, the rear connecting rod of the first connecting rod assembly extends forwards.

10. The vehicle seat according to claim 1, also comprising an anchor mechanism adapted to alternately adopt an active state in which it secures the backrest to the base in the folded position, and an inactive state in which it releases it therefrom.

11. The vehicle seat according to claim 1, in which there is no direct pivoting connection between the backrest and the seat proper.

* * * * *